(12) United States Patent
    Pavlou

(10) Patent No.: US 11,164,567 B2
(45) Date of Patent: Nov. 2, 2021

(54) SYSTEMS AND METHODS FOR EXTRACTION OF USER INTENT FROM SPEECH OR TEXT

(71) Applicant: Citrix Systems, Inc., Ft. Lauderdale, FL (US)

(72) Inventor: Chris Pavlou, Boca Raton, FL (US)

(73) Assignee: Citrix Systems, Inc., Ft. Lauderdale, FL (US)

(*) Notice: Subject to any disclaimer, the term of this patent is extended or adjusted under 35 U.S.C. 154(b) by 203 days.

(21) Appl. No.: 16/426,621

(22) Filed: May 30, 2019

(65) Prior Publication Data
    US 2020/0380962 A1    Dec. 3, 2020

(51) Int. Cl.
| | |
|---|---|
| *G10L 15/18* | (2013.01) |
| *G06F 9/451* | (2018.01) |
| *G06F 16/33* | (2019.01) |
| *G10L 15/22* | (2006.01) |
| *G06F 40/30* | (2020.01) |
| *G06F 40/242* | (2020.01) |
| *G10L 15/08* | (2006.01) |

(52) U.S. Cl.
    CPC .......... *G10L 15/1815* (2013.01); *G06F 9/453* (2018.02); *G06F 16/3344* (2019.01); *G06F 40/242* (2020.01); *G06F 40/30* (2020.01); *G10L 15/22* (2013.01); *G10L 2015/088* (2013.01); *G10L 2015/223* (2013.01)

(58) Field of Classification Search
    None
    See application file for complete search history.

(56) References Cited

U.S. PATENT DOCUMENTS

| | | | |
|---|---|---|---|
| 2014/0040748 A1* | 2/2014 | Lemay | G10L 15/1822 715/728 |
| 2014/0249831 A1* | 9/2014 | Gallopyn | G16H 40/20 705/2 |
| 2015/0348551 A1* | 12/2015 | Gruber | G06F 40/205 704/235 |
| 2019/0295544 A1* | 9/2019 | Garcia | G10L 15/22 |

* cited by examiner

*Primary Examiner* — Antim G Shah
(74) *Attorney, Agent, or Firm* — Finch & Maloney PLLC

(57) ABSTRACT

A computer system is provided. The computer system includes a memory and at least one processor configured to recognize one or more intent keywords in text provided by a user; identify an intent of the user based on the recognized intent keywords; select a workflow context based on the identified intent; determine an action request based on analysis of the text in association with the workflow context, wherein the action request comprises one or more action steps and the action steps comprise one or more data points; obtaining a workspace context associated with the user; and evaluate the data points based on the workspace context.

19 Claims, 8 Drawing Sheets

User Intent Extraction and Processing System 100

SYSTEMS AND METHODS FOR EXTRACTION OF USER INTENT FROM SPEECH OR TEXT

BACKGROUND

Mobile or desktop applications are sometimes used to formulate or create actions on behalf of a user. To formulate or create actions, some of these applications provide haptic interfaces to users. The complexity of these user interfaces varies, depending on the types and complexity of the information required to create desired actions. Some user interfaces collect information needed to create an action in as few as one or two discrete inputs. Other user interfaces require more inputs, sometimes distributed over several screens arranged in a hierarchical fashion.

SUMMARY

In at least one example, a computer system is provided. The computer system includes a memory; and at least one processor coupled to the memory and configured to: recognize one or more intent keywords in text provided by a user; identify an intent of the user based on the recognized intent keywords; select a workflow context based on the identified intent; determine an action request based on analysis of the text in association with the workflow context, the action request comprising one or more action steps and the action steps comprising one or more data points; obtaining a workspace context associated with the user; and evaluate the one or more data points based on the workspace context.

At least some examples of the computer system can include one or more of the following features. The at least one processor can be configured to identify modifier values in the text, the modifier values associated with the one or more data points, and can be configured to evaluate the one or more data points based on the modifier values. The at least one processor can be configured to employ a dictionary of the one or more data points to identify the modifier values in the text, the dictionary comprising links between each of the one or more data points and a dictionary of modifier values associated with the data point. The at least one processor can be configured to group the one or more data points into containers based on a subject matter associated with the one or more data points, wherein the one or more data points in each of the containers share modifier values.

The computer system can further include a microphone, and the at least one processor can be configured to execute an automatic speech recognition (ASR) engine, the ASR configured to convert a speech signal received through the microphone into the text. The computer system can further include a keyboard, and the at least one processor can be configured to receive the text through the keyboard.

In the computer system, the workspace context can include one or more of: information associated with co-workers of the user, information associated with physical facilities of the workspace of the user, and calendar data associated with the workspace of the user. The workspace context can be provided by the user, workspace applications employed by the user, a directory service, and/or a database of default values.

The computer system can further include a user interface configured to present the determined action request to the user, receive confirmation of the determined action request from the user, and/or resolve conflicts that arise from the determined action request based on input from the user. The at least one processor can be configured to execute a virtual assistant application, the virtual assistant application configured to execute the determined action request. The computer system can further include a network interface, and the virtual assistant application can be configured to communicate, through the network interface, with one or more cloud based entities to facilitate performance of the determined action request. The at least one processor can be configured to provide default values for unspecified action steps and unspecified data points.

In at least one example, a method of determining an action request based on user intent is provided. The method includes acts of recognizing, by a computer system, one or more intent keywords in text provided by a user; identifying, by the computer system, an intent of the user based on the recognized intent keywords; selecting, by the computer system, a workflow context based on the identified intent; determining, by the computer system, an action request based on analysis of the text in association with the workflow context, wherein the action request comprises one or more action steps and the action steps comprise one or more data points; obtaining, by the computer system, a workspace context associated with the user; and evaluating, by the computer system, the one or more data points based on the workspace context.

At least some examples of the method can include one or more of the following features. The act of identifying modifier values in the text, the modifier values associated with the one or more data points, and evaluating the one or more data points based on the modifier values. The act of employing a dictionary of the one or more data points to identify the modifier values in the text, the dictionary comprising links between each of the one or more data points and a dictionary of modifier values associated with the data point. The act of grouping the one or more data points into containers based on a subject matter associated with the one or more data points, wherein the one or more data points in each of the containers share modifier values. The act of executing an automatic speech recognition (ASR) engine, the ASR configured to convert a speech signal received through a microphone into the text. The workspace context can include one or more of: information associated with co-workers of the user, information associated with physical facilities of the workspace of the user, and calendar data associated with the workspace of the user. The workspace context can be provided by one or more of the user, workspace applications employed by the user, a directory service, a database of default values.

The method can further include the act of interacting with the user through a user interface (UI), the UI configured to perform one or more of: presenting the determined action request to the user, receiving confirmation of the determined action request from the user, and resolving conflicts that arise from the determined action request based on input from the user. The method can further include the act of executing a virtual assistant application, the virtual assistant application configured to execute the determined action request.

In at least one example, a non-transitory computer readable medium storing executable sequences of instructions to determine an action request based on user intent is provided. The sequences of instructions include instructions to: recognize one or more intent keywords in text provided by a user; identify an intent of the user based on the recognized intent keywords; select a workflow context based on the identified intent; determine an action request based on analysis of the text in association with the workflow context, wherein the action request comprises one or more action steps and the action steps comprise one or more data points;

obtain a workspace context associated with the user; and evaluate the one or more data points based on the workspace context.

At least some examples of the non-transitory computer readable medium can include one or more of the following features. Instructions to identify modifier values in the text, the modifier values associated with the one or more data points, and evaluating the one or more data points based on the modifier values. Instructions to employ a dictionary of the one or more data points to identify the modifier values in the text, the dictionary comprising links between each of the one or more data points and a dictionary of modifier values associated with the data point. Instructions to group the one or more data points into containers based on a subject matter associated with the one or more data points, wherein the one or more data points in each of the containers share modifier values.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
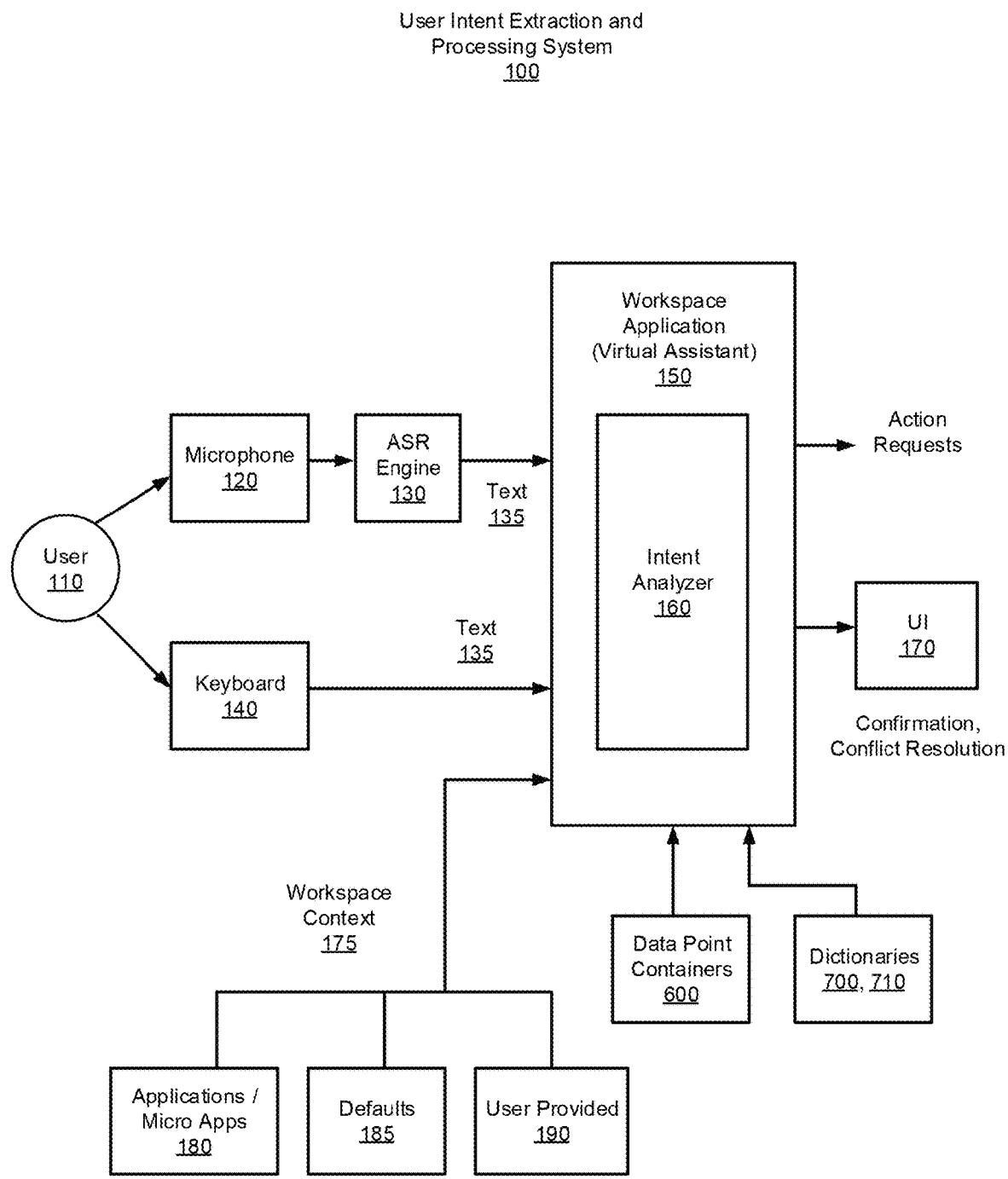
FIG. 1 is a block diagram of a user intent extraction and processing system in accordance with an example of the present disclosure.

As noted previously, mobile or desktop applications are sometimes used to formulate or create actions on behalf of a user, for example through a user interface. The steps involved in this process, however, can be numerous and cumbersome for the user to input via manual manipulation of a user interface, particularly on mobile devices. Additionally, the user may not always have all of the information needed, and readily available, to provide details at a level of specificity sufficient to create the desired action. To address this problem, and as summarized above, various examples described herein are directed to systems and methods for extraction of user intent from speech or text, and determination of action requests based on that intent. In some examples, these action requests may then be carried out or executed, for example, by a virtual assistant. These systems and methods overcome the difficulties that a user may otherwise experience when trying to enter an action request, along with any necessary details associated with that request, to a mobile or desktop application.

According to one example, a user may employ an application to request an action, for example to create an event such as a meeting. An action request may comprise a series of action steps and the action steps may in turn comprise one or more data points. A virtual assistant can be used to facilitate the collection of the data required for the action request. The action steps, for example in the case of a meeting event, might include: specifying a list of participants or invitees, a meeting location (e.g., office, conference room, virtual room), a meeting date, a starting time, and a duration. Although the virtual assistant can collect this information by walking the user through this series of steps, a more useful approach is for the virtual assistant to extract the needed information from spoken text using natural language processing, and use this information to complete the steps on behalf of the user. For example, the user might say "Setup a meeting with Chris and Rachelle in the team room for next Tuesday at 10 AM for one hour," which contains the information that a virtual assistant would need to process and execute the meeting setup request. Additionally, the virtual assistant may identify a workspace context associated with the user, which can provide details that may be used to fill in gaps in the information provided by the user, in an automated fashion.

In some examples, processing of the user supplied text (whether provided through a keyboard or as audio to be recognized) may include determining the user intent and then processing the action steps specific to that intent. The user intent is determined in the context of a workflow suited for that intent. For instance, in a "setup meeting" workflow, the intent can be determined by looking for keywords such as "meet with," "setup a meeting," "schedule a meeting," "create a meeting," etc. The action steps associated with the intent are then processed by searching the text for one or more data points for each step until that step is fully determined/specified. Lastly, any modifiers/attributes located before and/or after the data points for each step are processed and used to qualify the data points for that step.

Other workflow contexts are possible depending on the targeted universe (e.g., work related, personal related, pleasure related, etc.).

In the case of a meeting event, examples of action steps may include a list of names extracted from the text such as "with X," "with X and Y," or "with X, Y, and Z," etc. The list of names can be matched against recent contacts, a list of favorite contacts, and/or names such as "team" or "group," with data point modifiers such as "the," "my," or "our," etc. Examples of action steps may also include a location extracted from the text such as "in the X," "in the X room," or just "X room," etc. Further examples of action steps may include a meeting date extracted from the text such as "next Tuesday," "tomorrow," "December $5^{th}$," "a week from Monday," or "first Monday in August," etc., and a starting time extracted from the text such as "10," "3 o'clock," "at 5," "at noon," "at noon tomorrow," "in an hour," "first thing in the morning," or "tomorrow morning," etc. Data point modifiers such as "AM" or "PM" may also be extracted for time related data points. Further examples of action steps may include a duration extracted from the text such as "one hour" or "2 hours" or "45 minutes" or "an hour and 30 minutes" or "an hour and a half" or "half hour," etc. Default values may be set for any action steps that were not fully specified.

As previously mentioned, additional details can be determined from a workspace context. For example, a workspace context may include identities of project team members, locations of conference rooms, a calendar of available times for those rooms, location of the user, current time zone, and workday start and end times, etc.

A virtual assistant can present these event details to the user for confirmation. If any details are deemed to be missing or ambiguous, the virtual assistant can tag those action steps as requiring further user input and validation before creating the event. For example, if a location is not given and cannot otherwise be determined, the assistant can include that step for user entry if the user wants to include a location. Or, if the list of participants is inconclusive, the virtual assistant can present the user with names matching those that were listed, for the user to choose or confirm.

Thus, and in accordance with at least some examples disclosed herein, systems and methods for determination of user intent are provided. These systems and methods provide for extraction of user intent from speech or text, and determination and execution of action requests based on that intent.

As will be understood in view of this disclosure, the systems and methods for extraction of user intent from speech or text provided herein have several advantages over methods which require the user to manually and explicitly enter all information needed to specify an action request. For instance, the systems and methods described herein enable automated (or semi-automated) determination of the intended action request of the user along with details necessary to perform that action. For example, the user may say "set up a meeting to review project X," and the system may determine, from the workspace context, the members of the project X team to be invited and a conference room which is available at a convenient location and time.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

User Intent Extraction System

In some examples, a user intent extraction and processing system is configured to extract user intent from provided speech or text and determine action requests based on that intent. FIG. 1 illustrates a logical architecture of a user intent extraction and processing system 100 in accordance with an example of the present disclosure. As shown in FIG. 1, the system 100 includes a microphone 120, automatic speech recognition (ASR) engine 130, keyboard 140, a workspace application (e.g., a virtual assistant) 150, an intent analyzer 160, a user interface (UI) 170, and sources of workspace context information 175, including, for example, applications or micro-applications, 180, a database of default values 185, and a source of user provided default values 190. In some examples, the system may further include data point containers 600, a dictionary of data points 700, and dictionaries and attributes/modifiers 710.

The keyboard 140 is configured to allow the user 110, to provide direct input of text 135 to the workspace application 150. As an alternative or supplement to this method of text entry, a microphone 120, is configured to capture an audio signal associated with speech of the user for processing by ASR engine 130. The ASR engine 130 is configured to perform speech recognition on the audio signal to generate the text 135.

The workspace application 150, which in some examples may be a virtual assistant, is configured to analyze the provided text to determine the intent of the user 110 and to generate action requests based on that intent, as will be described in greater detail below. The workspace application 150 may employ intent analyzer 160 for this purpose. The operation of the intent analyzer 160, is described below in connection with FIGS. 2-7, but at a high level the intent analyzer 160 is configured to perform natural language processing on the user provided text 135 to recognize intent keywords, select a workflow context based on the intent, and determine an action request (e.g., comprising data points and modifiers) based on further analysis of the text in the workflow context and further based on information provided by a workspace context associated with the user. In some examples, the data point containers 600 may be used to organize data points into related groups and the dictionaries 700 and 710 may be used to link data points to attributes, for more efficient processing, as will be described in greater detail below in connection with FIGS. 6 and 7.

In some examples, the workspace application 150 is further configured to execute the action requests, for example, by communicating, through a network or the Internet, to cloud-based servers and systems that are configured to perform the requested actions. For example, a server at the workplace of the user may be configured to provide scheduling of conference rooms or other workplace facilities.

The UI 170 is configured to provide a mechanism for the user to confirm the action requests as determined by the system. Such confirmation may include confirming the validity of the action requests and/or confirming that the action requests should be executed. In the event that the determined action request is not accurate, the user may then be provided an opportunity to make any desired corrections through the UI. Additionally, in some examples, the UI is further configured to allow the user to resolve conflicts that may arise from the determined action request. For example, if the user asks to setup a meeting with certain parameters (e.g., location, participants, date/time, etc.) and one or more of the parameters is not suitable due to a conflict, the user may be provided an opportunity to choose among other alternatives. In some examples, the UI 170 may be a graphical user interface.

User Intent Extraction Process

Figure 2:
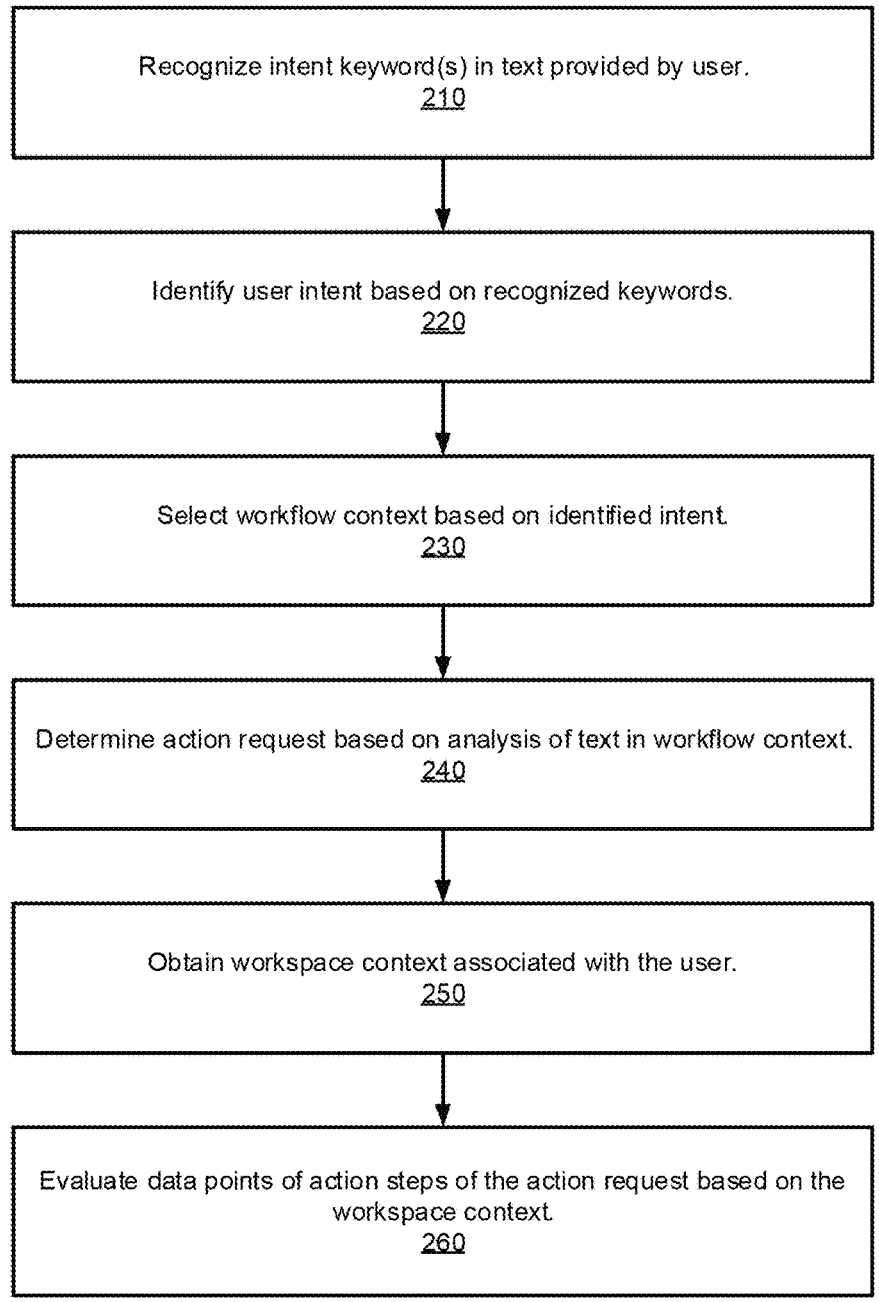
FIG. 2 is a flow diagram of a process for determining an action request based on extracted user intent in accordance with an example of the present disclosure.

As described above, some examples of the system 100 of FIG. 1 are configured to execute user intent extraction processes and determine action requests from the extracted intent. The processes may be executed on a processor of any suitable type (e.g., processor 803 of FIG. 8). FIG. 2 is a flow diagram 200 of a process for determining an action request based on extracted user intent, executed by any combination of workspace application 150 and intent analyzer 160, in accordance with an example of the present disclosure.

The process 200 starts with recognizing 210 one or more intent keywords in text 135 provided by the user 110. In some examples, a list of intent related keywords may be predetermined or preselected, depending on the application and language. Next, at operation 220, an intent of the user is identified based on the recognized intent keywords. For example, phrases with keywords such as "meet with," or "setup a meeting" indicate a user intention to create a meeting. In some examples, the text is provided by the user through keyboard 140. In some other examples, the text is generated by an ASR engine 130 operating on an audio signal provided by microphone 120 in response to speech of the user. Thus, the user may communicate with the system by typing or speaking, although any other suitable form of communication may also be used.

At operation 230, a workflow context is selected based on the identified intent. A workflow context allows for processing of the text in the context of the workflow that is suited for that intent. For example, in the case of a "setup a meeting" workflow context, additional keywords or key phrases such as "meet with" or "scheduled for" may be expected in the text.

At operation 240, an action request is determined based on analysis of the text in view of the selected workflow context. The action request comprises one or more action steps and the action steps comprise one or more data points. Continuing with the example of a "setup meeting" action request, the action steps may include "with X and Y," "in the Z room," "for tomorrow," etc., where X, Y, Z, and "tomorrow" are data points to be evaluated.

Figure 5:
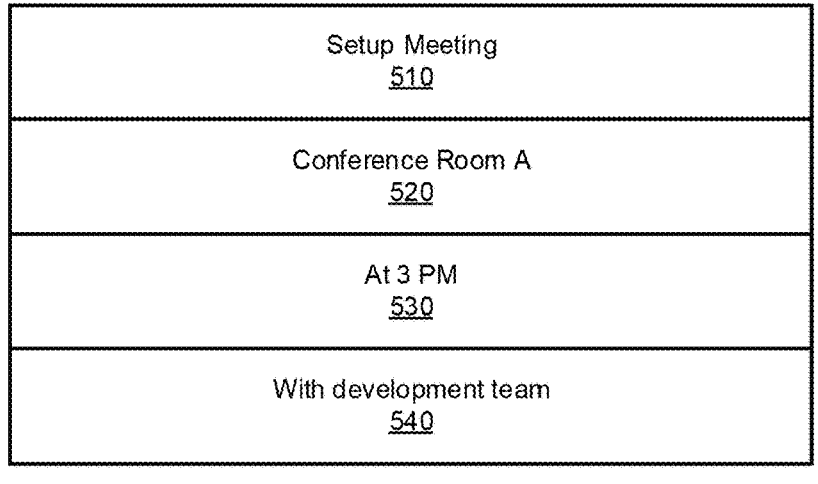
FIG. 5 illustrates an action request data structure and a workspace context data structure in accordance with an example of the present disclosure.
Figure 5:
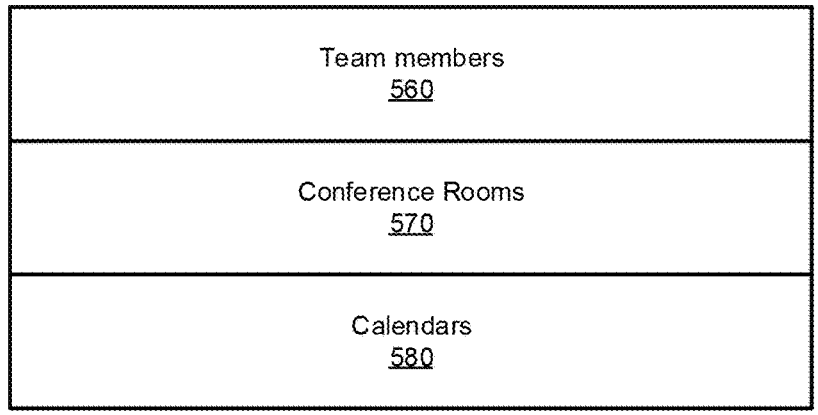

The action request can be represented as a data structure. One example of an action request data structure 500 is illustrated in FIG. 5, which may be populated with the determined action steps. The action steps in this example are shown to be "setup meeting" 510, "conference room A" 520, "at 3 PM" 530, "with the development team" 540. Of course, additional action steps may be included as appropriate for a given action request.

At operation 250, a workspace context associated with the user is obtained. The workspace context includes information and data relevant to the workspace of the user. For example, a workspace context may specify the normal working hours of the user, a holiday schedule for the company, a list of conference rooms available in the facility and their capacity, a list of co-workers or team members, other workplace physical facilities of interest, etc. The workspace context may also provide information on current or changing conditions, for example, the current time and date, the current weather, etc. In some examples, the workspace context may be provided by an application or microapplication 180 executing on the computing platform of the user, for example an email program, a calendar program, a web browser, company specific applications, a directory service, and the like. The workspace context may also be provided by a database 185 of default workspace contexts for each potential user, or provided by the user directly 190.

The workspace context can be represented as a data structure. One example of a workspace context data structure 550 is also illustrated in FIG. 5, and may be populated with workspace context information, as shown. In this example, that information includes a list of team members 560, a list of conference rooms 570, and a calendar of conference room availability 580.

At operation 260, the data points are evaluated based on the workspace context. For example, a request to meet with the team can be evaluated using information about the team members obtained from the workspace context so that the appropriate participants are invited to the meeting. Similarly, a request for a meeting can select an available conference room from the workspace context based on a requested time (e.g., data point), or select an available time slot from the workspace context corresponding to when a specific conference room is requested (e.g., data point). As yet a further example, a request to setup a meeting at 4 o'clock may be interpreted based on the current time provided by the workspace context. That is to say, if the current time is earlier than 4:00 it may be assumed that the request is for a meeting today, while if the current time is later than 4:00, the meeting request is likely to be intended for tomorrow.

Additionally, in some examples, modifier values (also referred to as attributes) may be identified in the text and associated with data points to assist in the evaluation of those data points. For example, "AM" or "PM" may be specified after a time value. In some further examples, default values may be supplied for unspecified action steps and/or data points.

In some examples, the determined action request may be provided to the user, for example through a user interface, for confirmation, to resolve conflicts, or to provide additional information.

In some examples, a virtual assistant application may be executed, wherein the virtual assistant application is configured to cause the determined action request to be performed. For example, the virtual assistant application may communicate, through network interface to one or more cloud based entities to facilitate the performance of the determined action request.

Processes in accordance with the process 200 enable the system 100 to determine and execute an action request based on user intent specified through speech or text, as described herein.

Figure 3:
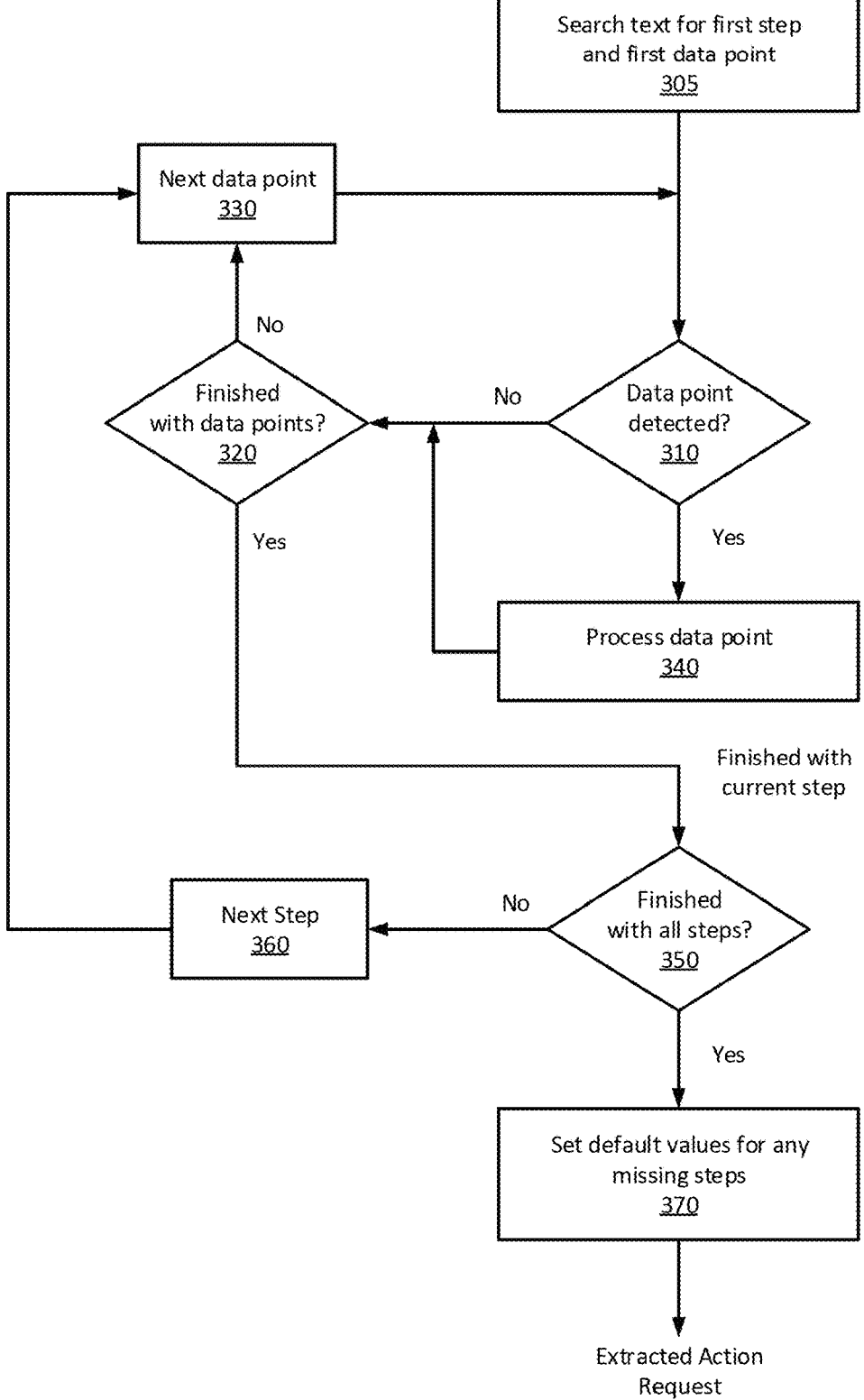
FIG. 3 is a flow diagram of an intent analyzer process in accordance with an example of the present disclosure.

In some examples, the intent analyzer 160 is configured to execute an intent analysis process. One example of an intent analysis process 300 in accordance with these examples is illustrated in FIG. 3. As shown in FIG. 3, the process 300 starts with searching 305 the text 135 for a first action step and a first data point associated with the first step.

If a data point is detected 310, then the data point (associated with the current action step) is processed 340. The processing 340, in at least one example, is described in greater detail below in connection with FIG. 4. After the data point has been processed (or if a data point is not detected), a check is performed 320 to determine if all data points associated with the current action step have been processed. If not, then the process repeats 330 for the next data point and the current step. Otherwise, processing of the current action step is complete, and a determination is made 350 as to whether all action steps have been completed. If not, then the process repeats 360 for the next action step. Otherwise, if all action steps have been completed, default values may be provided for any missing steps 370, and the extracted action request is obtained.

Figure 4:
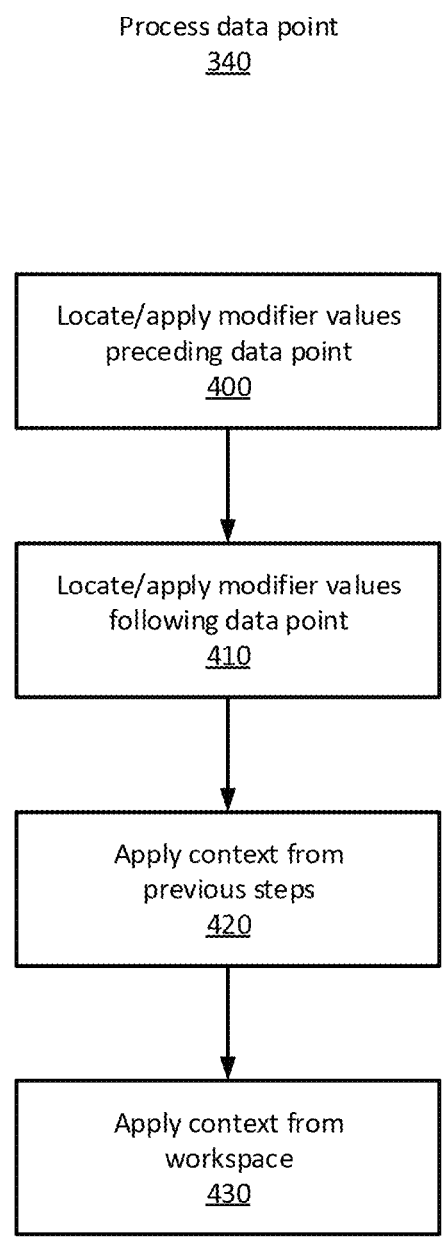
FIG. 4 is a flow diagram of the processing of data points in accordance with an example of the present disclosure.

FIG. 4 is a flow diagram of the processing 340 of data points in accordance with an example of the present disclosure. At operation 400, modifier values preceding the data points in the text are located and applied. For example, a modifier value of "early" occurring before the word "afternoon" may be applied to constrain the time of the action request. Similarly, a modifier value of "entire" occurring before the word "team" may be applied to determine the list of invitees to an event. At operation 410, modifier values following the data points in the text are located and applied. For example, a modifier value of "AM" occurring after a time designation such as "10 o'clock" may be applied to disambiguate the time of the action request. In some examples, data point containers 600 and dictionaries 700 and 710 may be used to facilitate the location and determination of modifier values, as described below in connection with FIGS. 6 and 7. At operation 420, any context that was used in the processing of prior action steps may be applied to processing of the current action step. At operation 430, the workspace context is applied to the current action step.

Figure 6:
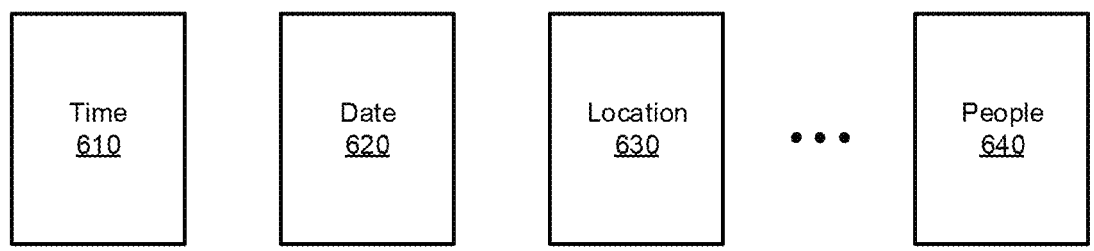
FIG. 6 illustrates data point containers in accordance with an example of the present disclosure.

FIG. 6 illustrates data point containers 600 in accordance with an example of the present disclosure. In some examples, data points may be grouped into containers as shown (e.g., for time related information 610, date related information 620, location related information 630, people related information 640, etc.) for use by intent analyzer 160. The containers provide one example mechanism for organizing such information groups in any desired order and organizing data points within each group in any desired manner, independent of a particular language syntax or flow, allowing the user to phrase instructions with greater flexibility. For example, searching for an "AM" or "PM" modifier in the text may be relevant when working with a data point in the time container 610, regardless of the location of that modifier relative to the data point. So, for example, the AM/PM modifier search may be expanded in range for data points in the time container to more than simply preceding 400 and following 410 the data point. The containers may be created, organized, and updated, as needed, based on the targeted "universe" (e.g., work related, personal related, pleasure related, etc.) and on the targeted language.

Figure 7:
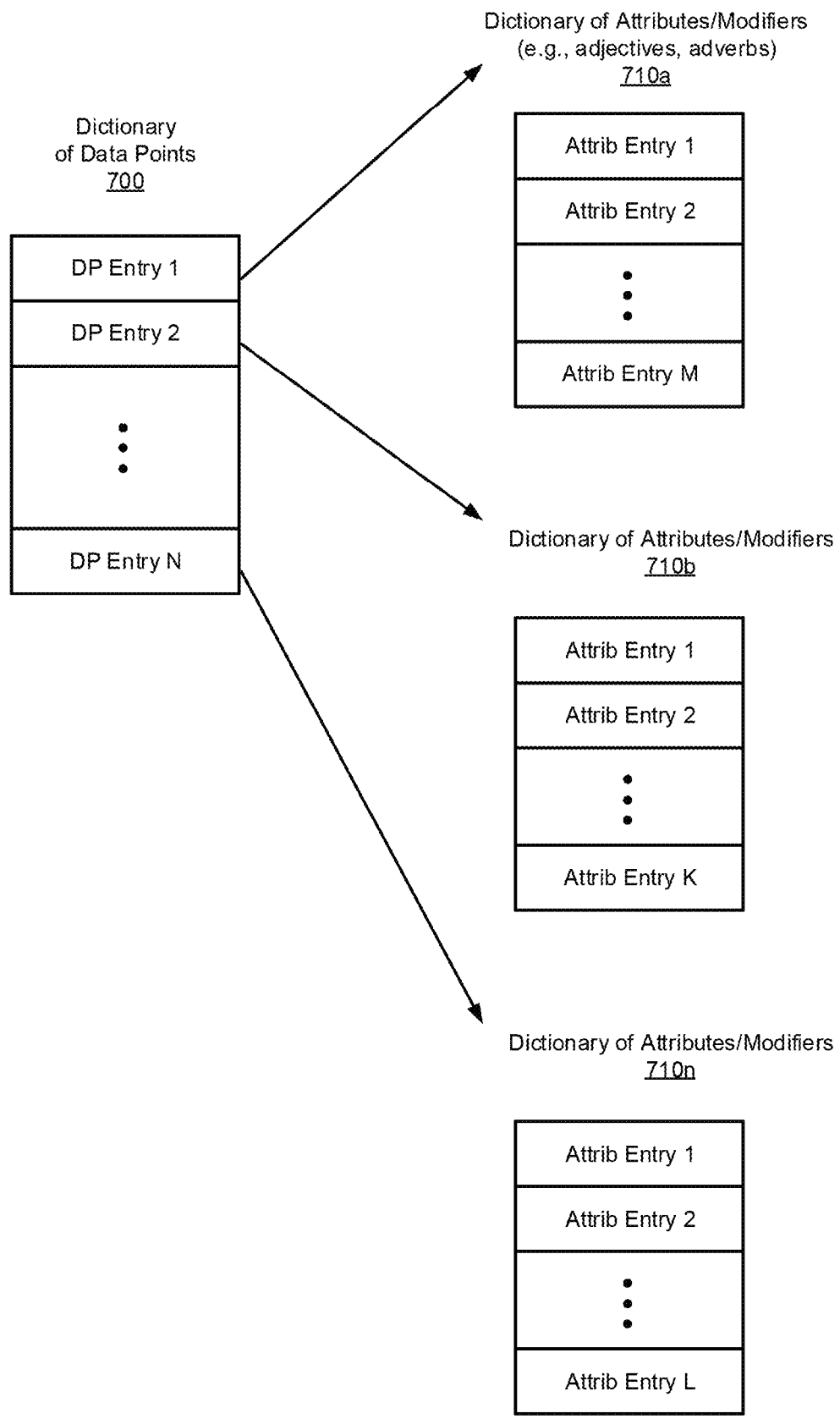
FIG. 7 illustrates dictionaries of data points and attributes/modifiers in accordance with an example of the present disclosure.

FIG. 7 illustrates dictionaries of data points 700 and dictionaries of associated attributes/modifiers 710 in accordance with an example of the present disclosure. In some examples, intent analyzer 160 may employ a dictionary of data points 700 comprising entries for relevant or expected data points (e.g., "meeting," "set up," etc.). Each entry may include a link to a dictionary of attributes/modifiers 710a, . . . 710n which are associated with that data point. For example, data points associated with time, such as "ten o'clock" may be linked to modifiers such as "AM" or "PM." As another example, data points associated with location, such as "conference room" may way be associated with modifiers such as "west," "east," or "second floor." The dictionaries may also be created, organized, and updated, as needed, based on the targeted "universe" (e.g., work related, personal related, pleasure related, etc.) and on the targeted language.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Computing Platform for User Intent Extraction

Figure 8:
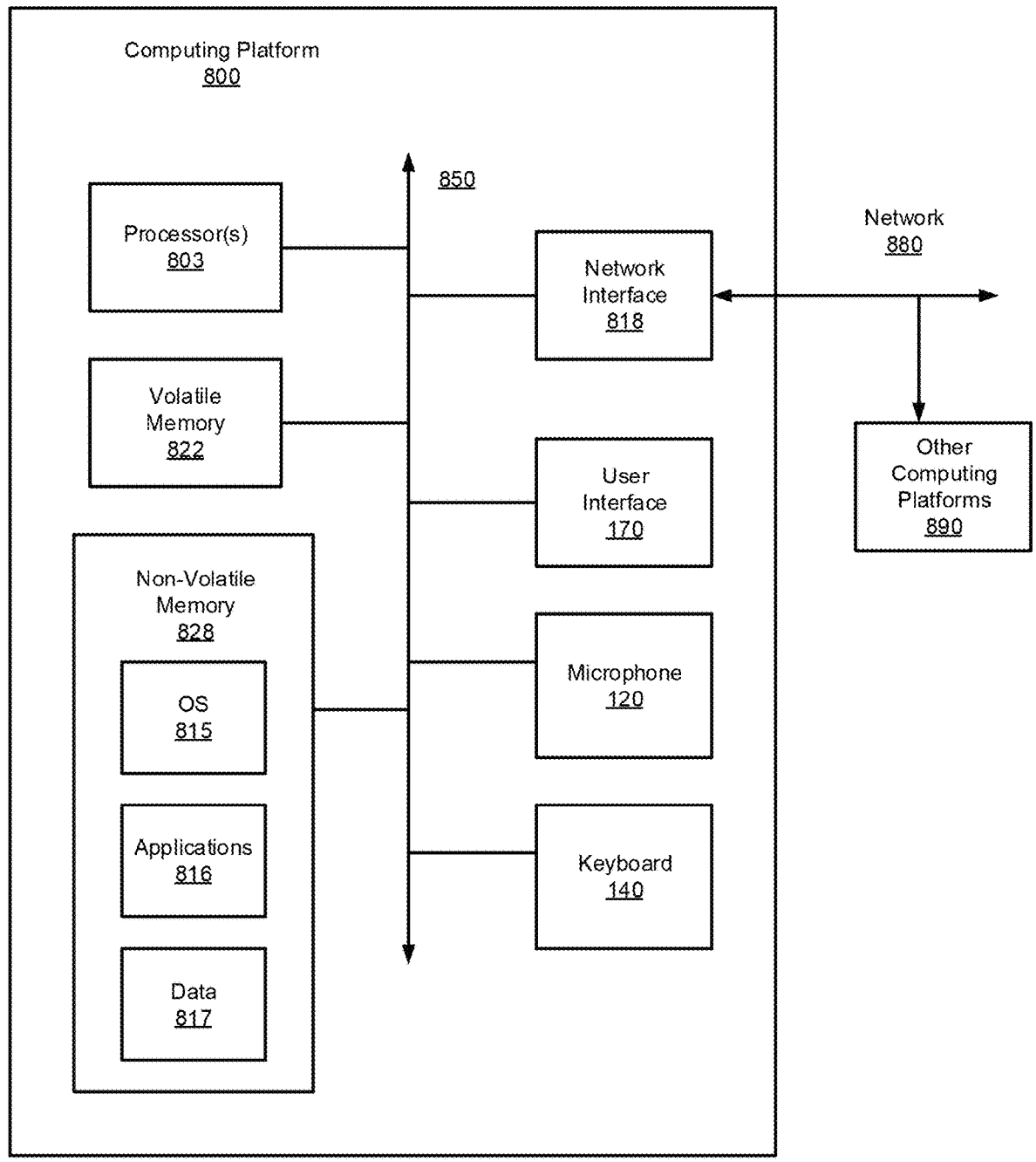
FIG. 8 is a block diagram of a computing platform configured to perform a process for determining an action request based on extracted user intent in accordance with an example of the present disclosure.

FIG. 8 is a block diagram of a computing platform 800 configured to perform a process for determining an action request based on extracted user intent in accordance with an example of the present disclosure.

The computing platform or device 800 includes one or more processors 803, volatile memory 822 (e.g., random access memory (RAM)), non-volatile memory 828, user interface (UI) 170, one or more network or communication interfaces 818, and a communications bus 850. The computing platform 800 may also be referred to as a computer or a computer system.

The non-volatile (non-transitory) memory 828 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 170 can include a graphical user interface (GUI) (e.g., a touchscreen, a display, etc.) and one or more input/output (I/O) devices (e.g., a mouse, a keyboard 140, a microphone 120, one or more speakers, one or more cameras, one or more biometric scanners, one or more environmental sensors, and one or more accelerometers, etc.).

The non-volatile memory 828 stores an operating system 815, one or more applications 816, and data 817 such that, for example, computer instructions of the operating system 815 and/or the applications 816 are executed by processor(s) 803 out of the volatile memory 822. In some examples, the volatile memory 822 can include one or more types of RAM and/or a cache memory that can offer a faster response time than a main memory. Data can be entered through the user interface 170 or received from the other I/O device(s) 120, 140. Various elements of the computer 800 can communicate via the communications bus 850.

The illustrated computing platform 800 is shown merely as an example client device or server and can be implemented by any computing or processing environment with any type of machine or set of machines that can have suitable hardware and/or software capable of operating as described herein.

The processor(s) 803 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor 803 can be analog, digital or mixed. In some examples, the processor 803 can be one or more physical processors, or one or more virtual (e.g., remotely located or cloud) processors. A processor including multiple processor cores and/or multiple processors can provide functionality for parallel, simultaneous execution of instructions or for parallel, simultaneous execution of one instruction on more than one piece of data.

The network interfaces 818 can include one or more interfaces to enable the computing platform 800 to access a computer network 880 such as a Local Area Network (LAN), a Wide Area Network (WAN), a Personal Area Network (PAN), or the Internet through a variety of wired and/or wireless connections, including cellular connections. In some examples, the network 880 may allow for communication with other computing platforms 890, to enable distributed computing.

In described examples, the computing platform 800 can execute an application on behalf of a user of a client device. For example, the computing platform 800 can execute one or more virtual machines managed by a hypervisor. Each virtual machine can provide an execution session within which applications execute on behalf of a user or a client device, such as a hosted desktop session. The computing platform 800 can also execute a terminal services session to provide a hosted desktop environment. The computing platform 800 can provide access to a remote computing environment including one or more applications, one or more desktop applications, and one or more desktop sessions in which one or more applications can execute.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system comprising:
a memory; and
at least one processor coupled to the memory and configured to:
recognize one or more intent keywords in text provided by a requesting user who is a member of a workgroup that includes one or more additional workgroup members;
identify an intent of the requesting user based on the recognized one or more intent keywords;
select a workflow context based on the identified intent;
determine an action request based on analysis of the text in association with the workflow context, the action request comprising one or more action steps and the one or more action steps comprising one or more data points;
obtain a workspace context associated with the workgroup, wherein the workspace context defines one or more characteristic values that apply to both the requesting user and the one or more additional workgroup members;
assign a particular characteristic value acquired from the workspace context to a first one of the one or more data points;
employ a dictionary to identify modifier values in the text, the modifier values associated with the one or more data points, and the dictionary comprising a link between a second one of the one or more data points and a particular one of the modifier values; and
assign the particular modifier value to the second one of the one or more data points.

2. The computer system of claim 1, wherein the at least one processor is further configured to group a subset of the one or more data points into a container based on a common subject matter associated with the subset of the one or more data points, and wherein the subset of the one or more data points shares at least one of the modifier values.

3. The computer system of claim 1, further comprising a microphone, and wherein the at least one processor is further configured to execute an automatic speech recognition (ASR) engine, the ASR engine configured to convert a speech signal received through the microphone into the text.

4. The computer system of claim 1, further comprising a keyboard, and wherein the at least one processor is further configured to receive the text through the keyboard.

5. The computer system of claim 1, wherein the workspace context includes one or more of: information associated with physical facilities of a workspace of the requesting user and calendar data associated with the workspace of the requesting user.

6. The computer system of claim 1, wherein the workspace context is provided by the requesting user, workspace applications employed by the requesting user, a directory service, and/or a database of default values.

7. The computer system of claim 1, further comprising a user interface configured to present the determined action request to the requesting user, receive confirmation of the determined action request from the requesting user, and/or resolve conflicts that arise from the determined action request based on input from the requesting user.

8. The computer system of claim 1, wherein the at least one processor is further configured to execute a virtual assistant application, the virtual assistant application configured to execute the determined action request.

9. The computer system of claim 8, further comprising a network interface, and wherein the virtual assistant application is further configured to communicate, through the network interface, with one or more cloud based entities to facilitate performance of the determined action request.

10. The computer system of claim 1, wherein the at least one processor is further configured to provide default values for unspecified action steps and unspecified data points.

11. A method of determining an action request based on user intent comprising:
recognizing, by a computer system, one or more intent keywords in text provided by a requesting user who is a member of a workgroup that includes one or more additional workgroup members;
identifying, by the computer system, an intent of the requesting user based on the recognized one or more intent keywords;
selecting, by the computer system, a workflow context based on the identified intent;
determining, by the computer system, an action request based on analysis of the text in association with the workflow context, wherein the action request comprises one or more action steps and the one or more action steps comprise one or more data points;
obtaining, by the computer system, a workspace context associated with the workgroup, wherein the workspace context defines one or more characteristic values that apply to both the requesting user and the one or more additional workgroup members;
assigning, by the computer system, a particular characteristic value acquired from the workspace context to a first one of the one or more data points;
employing a dictionary to identify modifier values in the text, the modifier values associated with the one or more data points, and the dictionary comprising a link between a second one of the one or more data points and a particular one of the modifier values; and
assigning the particular modifier value to a second one of the one or more data points.

12. The method of claim 11, further comprising grouping a subset of the one or more data points into a container based on a common subject matter associated with the subset of the one or more data points, wherein the subset of the one or more data points shares at least one of the modifier values.

13. The method of claim 11, further comprising executing an automatic speech recognition (ASR) engine, the ASR engine configured to convert a speech signal received through a microphone into the text.

14. The method of claim 11, wherein the workspace context includes one or more of: information associated with physical facilities of a workspace of the requesting user and calendar data associated with the workspace of the requesting user.

15. The method of claim 11, wherein the workspace context is provided by one or more of the requesting user, workspace applications employed by the requesting user, a directory service, and a database of default values.

16. The method of claim 11, further comprising interacting with the requesting user through a user interface (UI), the UI configured to perform one or more of: presenting the determined action request to the requesting user, receiving confirmation of the determined action request from the requesting user, and resolving conflicts that arise from the determined action request based on input from the requesting user.

17. The method of claim 11, further comprising executing a virtual assistant application, the virtual assistant application configured to execute the determined action request.

18. A non-transitory computer readable medium storing executable sequences of instructions to determine an action request based on user intent, the sequences of instructions comprising instructions to:
recognize one or more intent keywords in text provided by a requesting user who is a member of a workgroup that includes one or more additional workgroup members;
identify an intent of the requesting user based on the recognized one or more intent keywords;
select a workflow context based on the identified intent;
determine the action request based on analysis of the text in association with the workflow context, wherein the action request comprises one or more action steps and the one or more action steps comprise one or more data points;
obtain a workspace context associated with the workgroup, wherein the workspace context defines one or more characteristic values that apply to both the requesting user and the one or more additional workgroup members;
assign a particular characteristic value acquired from the workspace context to a first one of the one or more data points;
employ a dictionary to identify modifier values in the text, the modifier values associated with the one or more data points, and the dictionary comprising a link between a second one of the one or more data points and a particular one of the modifier values; and
assign the particular modifier value to a second one of the one or more data points.

19. The computer readable medium of claim 18, wherein the sequences of instructions further include instructions to group a subset of the one or more data points into a container based on a common subject matter associated with the subset of the one or more data points, and wherein the subset of the one or more data points shares at least one of the modifier values.

* * * * *